United States Patent

[11] 3,620,528

| [72] | Inventor | Rudolf Skocir<br>Koppern/Taunus, Germany |
|---|---|---|
| [21] | Appl. No | 859,948 |
| [22] | Filed | Sept. 22, 1969 |
| [45] | Patented | Nov. 16, 1971 |
| [73] | Assignee | Maschinenfabrik Turner A. G. Oberursel<br>Taunus, Germany |
| [32] | Priority | June 10, 1969 |
| [33] | | Germany |
| [31] | | P 19 29 207.0 |

[54] APPARATUS FOR FEEDING FLEXIBLE SHEET MATERIAL TO A PAIR OF TRANSPORT ROLLERS
10 Claims, 5 Drawing Figs.

[52] U.S. Cl. ................................... 271/51, 83/4
[51] Int. Cl. ................................... B65h 5/06
[50] Field of Search ......................... 271/36, 37, 51; 83/4

[56] References Cited
UNITED STATES PATENTS

| 1,027,613 | 5/1912 | Kimball | 271/36 |
| 1,383,133 | 6/1921 | Lucke | 83/4 |
| 1,651,190 | 11/1927 | Dalton | 271/51 |
| 1,978,056 | 10/1934 | Nelson | 271/36 |
| 1,991,989 | 2/1935 | Trompier | 271/36 |
| 2,705,636 | 4/1955 | LaBombard | 271/36 |
| 3,344,627 | 10/1967 | Braun | 83/4 |

Primary Examiner—Joseph Wegbreit
Attorney—Wolfgang G. Fasse

ABSTRACT: The present invention relates to an apparatus for feeding flexible sheet material such as animal hides to a pair of transport rollers especially in connection with a leather-splitting machine. The invention provides a guide surface which is located adjacent to one of the transport rollers thus creating a guide channel leading into a feed gap between two transport rollers. The guide surface presses the sheet material first against the transport roller which acts as a drive roller with such a looping angle that the sheet material is positively fed into the feed gap.

3,620,528

APPARATUS FOR FEEDING FLEXIBLE SHEET MATERIAL TO A PAIR OF TRANSPORT ROLLERS

BACKGROUND OF THE INVENTION

The present invention relates to an apparatus for feeding flexible sheet material such as animal hides to a pair of transport rollers in connection with a leather-splitting machine.

In the past the use of such machines has involved several problems. For practical reasons it is not possible to increase the feed in space between the transport rollers by increasing the roller diameter beyond predetermined value because the rollers would assume undesirably large dimensions. Thus, the mentioned space between the feel rollers forms a feed gap having an opening angle which becomes increasingly more unfavorable for proper feeding as the thickness of the sheet material exceeds the spacing between the transport rollers. As a result, the sheet material, especially thick sheet material, tends to bulge or wrinkle in front of the pair of transport rollers.

In the prior art practice, especially in connection with leather-splitting machines, the above drawback has been remedied to some extent by means of a tamping tool which has a wedge-shaped tip and which is used to manually push the hides to be fed to the splitting machine, into the gap between the transport rollers. This manual tamping or pressing of the hides is especially difficult because the hides usually have a leading edge of rather uneven outline. Thus, wrinkling cannot be avoided. Such wrinkling causes, especially in connection with leather splitting, cuts which extend through the hides in a nonuniform manner. Further, the wrinkling hinders very substantially the operation of such machines. The precision of the splitting as well as the operational speed are reduced. Besides, the manual tamping of the sheet material is a source of danger for the personnel operating such machines.

In view of the above it is the main object of the invention to overcome the outlined drawbacks.

Yet, another object of the invention is to provide a positive feed advance for the sheet material into the gap between the two transport rollers.

Still another object of the invention is to assure that the sheet material is drawn uniformly along its entire leading edge into the gap between the feed rollers in order to avoid the bulging and wrinkling of the sheet material.

A still further object of the invention is to provide a guide surface adjacent to a feed or drive roller, which surface will guide the sheet material into contact with the drive roller of a pair of transport rollers prior to the time when both transport rollers contact the sheet material.

Still another object of the invention is to provide a guide surface which has a coefficient of friction between itself and the sheet material which is substantially smaller than the respective coefficient of friction between the sheet material and the surface of the drive roller.

A still further important object of the invention is to provide a guide surface which adapts itself to sheets of different widths or thickness, especially sheets having a varying thickness throughout the sheet size, which is usually so in connection with animal hides which are thicker in certain areas and thinner in other areas.

A still further object of the invention is to safely feed even wet or highly flexible sheet material through a pair of transport rollers, for example, wet hides to be fed through a leather-splitting machine.

SUMMARY OF THE INVENTION

Briefly, the above objects have been achieved according to the invention by providing a guide surface positioned upstream of one roller of a pair of transport rollers relative to the transport direction which is defined by the direction of rotation of said rollers. The guide surface has such a curvature that the sheet material is brought into contact first with the drive roller with such a looping angle that the sheet material is positively fed by the drive roller into the gap between the pair of rollers. By guiding the sheet material into cooperation with one roller prior to the time when the sheet material moves into the spacing or gap between the two rollers, said one roller operates as a drive means and pushes the sheet material along the guide surface and into the gap. Such pushing takes place along the entire breadth of the sheet material so that the sheet material is fed uniformly into the space between the rollers. Due to the positive feed by said one roller acting as a drive roller the sheet material is pressed into the gap. Thus, it is avoided that only certain portions of the sheet material are subject to the positive feed drive as has been the case when the sheet material has been manually tamped into the gap. Accordingly, the invention avoids with certainty the bulging of the sheet material as it moves into the spacing between the rollers.

Furthermore, due to the fact that the sheet material is positively gripped along its entire operational breadth, it will be spread while it is being fed into the spacing without any wrinkling. Thus, the apparatus according to the invention has the additional advantage, especially in connection with animal hides, that simultaneously with the feeding the hides are spread, whereas such spreading was previously a cumbersome separate operation or it had to be accomplished by auxiliary means whereby the difficulty arose that the sheet material tended to bulge in such auxiliary means, for example in separate spreading rollers.

Preferably the guide surface is shaped, according to the invention, in such a manner that the spacing between the guide surface and the drive roller be decreased at least in the area of the feed gap between the rollers. In order to assure small friction between the sheet material and the guide surface, the guide surface is provided with a suitable surface finish.

According to the invention, the guide surface is suitably attached to a feed table by means of a rigid connection whereby the feed table surface continues into the guide surface. In a modified embodiment of the invention, the guide surface is supported by elastic, yielding means. Such yielding supporting means are advantageous in connection with the handling of sheet materials having different widths or irregularities therein, as is frequently the case with animal hides. To compensate for such irregularities in the widths of the hides it is also possible to subdivide the guide surface into a plurality of resiliently supported individual guide sections which in their entirety extend along the working breadth.

In order that the invention may be clearly understood it will now be described, by way of example, with reference to the accompanying drawings, wherein.

Figure 1:
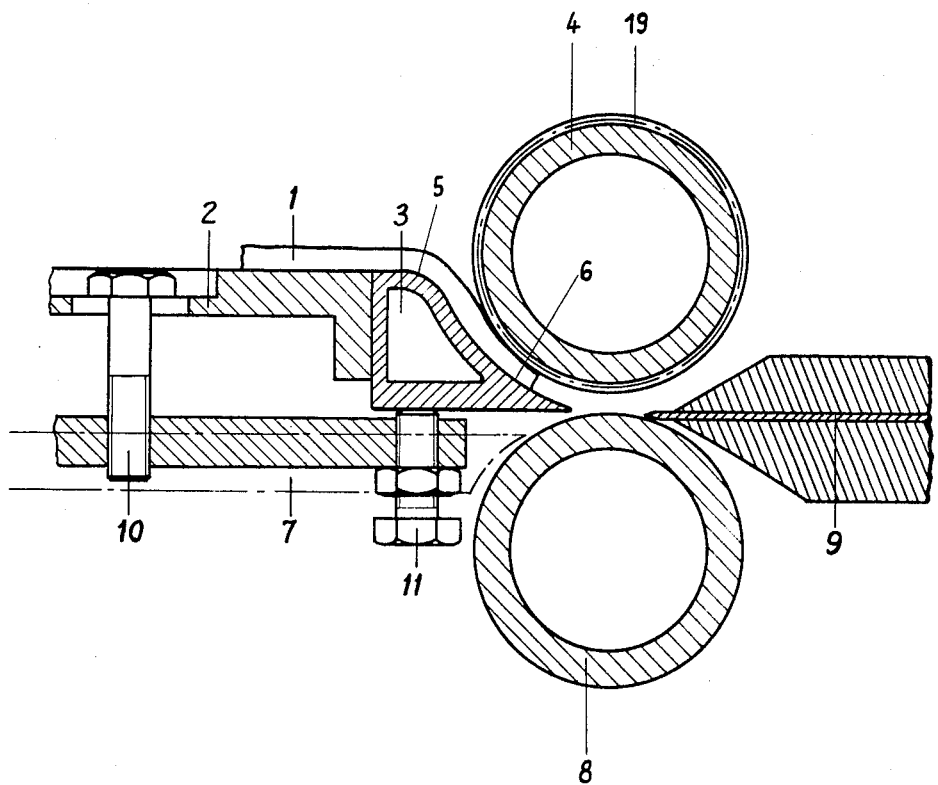
FIG. 1 is a sectional side view of the apparatus according to the invention shown in connection with leather splitting means, and wherein the sheet material is first guided into contact with the upper drive roller of a pair of transport rollers.

FIG. 1 illustrates the input section of a leather-splitting machine in which the leather 1 is fed over a feed table 2 through a feed gap 20 between two transport rollers 6 and 8 toward a leather-splitting knife 9. The feed table 2 is connected to a baseplate 7 by means of threaded bolts 10 and 11. The feeding of the leather 1 toward the splitting knife 9 takes place in a known manner by means of said transport rollers 4 and 8 of which the transport roller 4 has a rifled surface 19 in order to assure a positive engagement between the leather and the transport roller. Thus the transport roller 4 acts as a drive roller.

The direction in which the sheet material advances is indicated by the arrow 21. Upstream relative to such feed direction and between an edge 22 of the table 2 and the drive roller 4 there is arranged a guide member 3 rigidly attached to said edge 22 of table 2, for example, by means of bolts and nuts extending through a longitudinal slot in the rear wall of the guide member 3 and through a hole in the table edge 22. The guide member 3 has a guide surface 6 over which the leather slides on its way into the feed gap 20 between the rollers 4 and 8. The feed gap 20 has such a width that the leather or sheet material is compressed between the transport rollers 4 and 8 in order to achieve a sufficient friction. According to the invention the guide surface 6 is arranged so that the leather 1 is first brought into contact with the drive roller 4 prior to contacting both rollers as the sheet material moves through the gap 20. The guide surface 6 is provided with such a curvature that the leather or sheet material loops itself around the drive roller 4 with a looping angle which is defined by the curvature of the surface 6, thus causing the positive feed of the sheet material by the drive roller 4. The feed advance of the sheet material or leather 1 is thus assured or forced by the cooperation of the drive roller 4 and the guide surface 6 whereby the leading edge of the sheet material 1 eventually advances into the feed gap 20 between the rollers 4 and 8 where, due to the just-mentioned positive feed advance, the sheet material cannot bulge and where it is safely pressed into the feed gap. The sheet material then advances toward the knife 9 whereby it is split in a known manner.

In order to easily feed the sheet material into the space between the drive roller 4 and the guide surface 6, the guide member 3 has a bridging section 5 which provides a smooth passage between the surface of the feed table 2 and the guide surface 6 proper. As seen in FIG. 1 such bridging section 5 provides a funnel-shaped opening or passage between the guide members 3 and the drive roller 4 so that the sheet material 1 may be easily fed into the space between the drive roller 4 and the guide surface 6. As soon as the sheet material comes into contact with the drive roller 4, it will be automatically taken along by the guide roller whereby the friction will be steadily increased as the spacing between the guide surface 6 and the transport roller 4 decreases in the direction of feed toward the feed gap 20. Basically it is sufficient if the spacing between the guide surface 6 and the drive roller 4 decreases merely in the entrance portion of the just-described funnel that is, immediately following the smooth bridging section 5 for achieving the funnel action as described above. However, in connection with especially unwieldy leather it may be desirable to achieve the largest friction only at the end of the guide surface 6 where the leather or sheet material has its leading edge in a position immediately ahead or upstream of the spacing 20 between the transport rollers 4 and 8. In this instance it is practicable to provide the guide surface 6 in the form of a cylinder wall having a radius of curvature larger than the respective radius of the drive roller 4. Giving the guide surface 6 a cylindrical form has, incidentally, the advantage that it facilitates the manufacture of the guide surface because a circularly shaped surface is more easily machined than most other curved shapes.

To assure that the sheet material 1 is properly taken along by the drive roller 4 relative to the stationary guide member 3 it is necessary to provide the guide surface 6 with a sufficient smoothness. Thus, for practical purposes the guide surface 6 should have such a surface finish that the coefficient of friction between the guide surface 6 and the sheet material 1 is several times smaller than the respective coefficient between the drive roller 4 and the sheet material 1. For example, it is possible to achieve the desired smooth finish on the guide surface 6 by polishing it.

Pressing the sheet material 1 against the transport roller 4 by means of the guide surface 6 spreads the sheet material, especially leather, so that any wrinkling of the leather as it moves into the spacing between the rollers 4 and 8 is avoided. This has the advantage that the lower transport roller 8 is not employed for the spreading function for all practical purposes so that it can serve for the safe and guided feeding of the leather to the splitting knife 9.

The attachment of the feed table 2 and the guide member 3 to the baseplate 7 by means of threaded bolts 10 and 11 makes possible an adjustment of the guide member 3 in a vertical direction relative to the edge 22 of feed table 2. This vertical adjustment varies the spacing between the guide surface 6 and the transport drive roller 4 so that the present apparatus is capable of handling sheet material having varying thicknesses. Once the bolt 11 has reached the desired position a counter nut 23 is rotated until it bears against the baseplate 7 thus holding the threaded bolt 11 and with it the guide member 3 in the desired spacing position.

Figure 2:
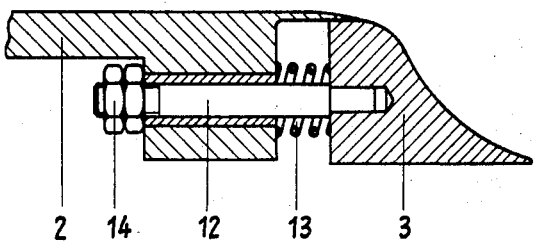
FIG. 2 shows a sectional side view of a yieldably supported guide surface.

In connection with the handling of animal hides it is frequently necessary to compensate for irregularities in the thickness of the hides. An automatic adjustment in response to such thickness irregularities is accomplished in the embodiments of FIGS. 2, 3 and 4. Referring first to FIG. 2, there is shown an arrangement in which the feed table 2 has a top surface 24 with an extension 25. The extension 25 provides an overhang under which the guide member 3 is elastically supported by means of a threaded bolt 12 the right-hand end of which is threaded into the guide member 3 and the end of which is threaded into nuts 14. The bolt 12 extends through a bore 26 in the edge 22 of the feed table 2. A spring member 13 is positioned around the threaded bolt 12 between the edge 22 and the rear surface of the guide member 3. The guide member serves the same purpose as that shown in FIG. 1. The guide member 3 is elastically adjustable relative to the feed table 2. The guide member 3 extends in parallel to the edge of the feed table 2. Due to the overhang 25 the guide member is itself guided in parallel to the edge of the table. If desired, several threaded bolts 12 and spring members 13 may be spaced along the entire length of the table edge 22 and guide member 3. The spring member 13, which may be a helical spring for example, is biased to press the guide member 3 away from the edge of the feed table 2. The force which counters the spring force may be adjusted by turning counternuts 14 to define a desirable outer or end position for the guide member 3. If now especially thick pieces of leather are fed into the apparatus, the guide member 3 can yield in a direction opposite to the feed direction whereby the spacing between its guide surface 6 and the cooperating drive roller is increased thus providing sufficient room for an increased thickness of the sheet material passing through the spacing.

Figure 3:
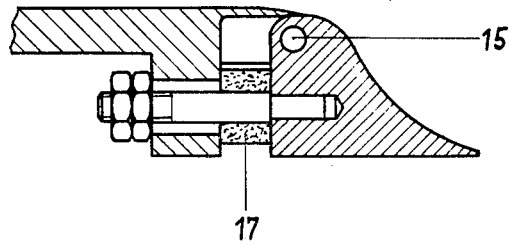
FIG. 3 illustrates a sectional view of a rotatably and yieldably supported guide surface.

FIG. 3 illustrates a modification of the embodiment according to FIG. 2 The guide member 3 is journaled to a shaft 15 securely held in the front end of the feed table 2, said shaft having its ends mounted in side members 29 of the table. A yielding cushion 17, for example of rubber, is located in the same manner as the spring member 13 in FIG. 2 When the guide member 3 rotates in the clockwise direction the rubber cushion 17 is compressed and thus functions in the same manner as the spring member 13 of FIG. 2.

Figure 4:
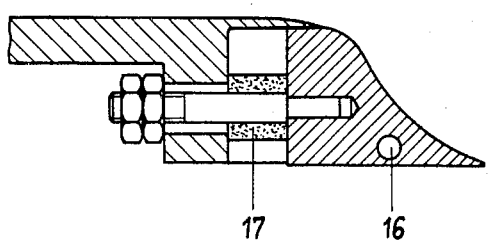
FIG. 4 illustrates a modification of the arrangement according to FIG. 3.

FIG. 4 illustrates yet another possibility of rotatably supporting the guide member 3. In FIG. 4 an axle or shaft 16 is secured to the lower portion of a side member 27 of the table edge 22. Arranging the journaling shaft 16 as shown in FIG. 4 makes it possible for the guide member 3 to rotate in the counterclockwise direction thereby increasing the spacing between the guide surface 6 of guide member 3 and the cooperating drive roller in the lead-in portion of the passage toward the gap 20. Contrary thereto, the arrangement according to FIG. 3 with the shaft 15 in a top portion of guide member 3 provides a possibility for the guide member 3 to yield at its lower end in the clockwise direction and adjacent to the feed gap 20. It will depend on the nature of the possible thickness variations to be handled whether the embodiment of FIG. 3 or that of FIG. 4 should be used.

In order to compensate for thickness variations which do not extend over the entire breadth of the sheet material but are distributed as individual spots over the entire area of the sheet material, the invention includes dividing the guide surface 6 into a plurality of elements which are preferably supported in an elastic manner as described with reference to FIGS. 2, 3 or 4. The elements can yield individually when a spot of increased thickness passes by so that the sheet material is pressed uniformly against the respective transport roller along its entire operational breadth. To illustrate such a structure comprising individual guide elements, reference is made to FIGS. 2 to 4 whereby in these figures the guide member 3 represents such individual guide elements. Such elements would be placed adjacent to each other along a row and the elements would, together, occupy the entire width of the feed table, with the guide surfaces being subdivided in accordance with the number of elements making up the entire row.

Figure 5:
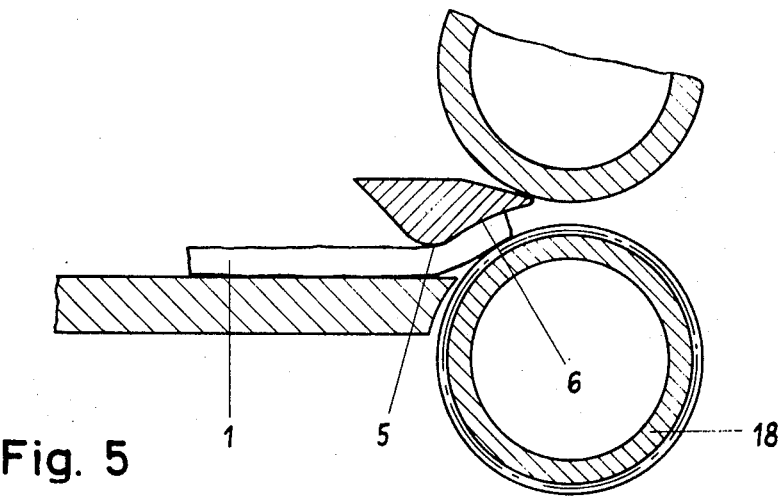
FIG. 5 shows an arrangement in which the sheet material is guided first into contact with the lower drive roller of a pair of transport rollers.

FIG. 5 illustrates still another modification as compared to the apparatus disclosed in FIG. 1. In FIG. 5 the guide member 3' is arranged above the feed table 2' and opposite the lower transport roller 8' for cooperation therewith. To provide an effective driving force between the lower transport roller 8' and the guide surface 6', the transport roller 8' is provided with a rifled surface 9' in the same manner as above described with reference to FIG. 1. The guide member 3' may be supported by stationary means, not shown, and it may be adjustable to provide the funnel-shaped passage as described above. In the embodiment of FIG. 5 the table 2' has a tip 28 which is positioned to properly feed the sheet material into the funnel-shaped passage between guide member 3' and the drive roller 8' and thence into the feed gap 30. Here again the curvature of the guide surface 6' presses the sheet material 1 in a predetermined looping angle against the surface of the transport roller 8' whereby the function is the same as that described with reference to FIG. 1.

Guiding the sheet material by the guide surface 6' against the lower transport or drive roller 8' is particularly advantageous in connection with a leather-splitting machine comprising an upper transport roller 4' the surface of which is made up of yieldably linked members in which the links are adapted for compensating in a known manner the irregularities in the thickness of the leather or sheet material. If the links of the upper transport roller yield in response to thickness variations of the material being fed through the spacing between the two transport rollers, unequal or differing pressing forces would bear against the guide surface if the guide surface should be arranged to cooperate with the link transport roller. Therefore, it is preferable in this instance to position the guide surface for cooperation with the lower drive roller 8' so that a better spreading and feeding of the leather is accomplished due to the cooperation between an unyielding transport roller and the guide surface. Here again the guide surface may be divided into individual elements, if desired, for compensating thickness variations.

It has been found that the apparatus according to the invention has removed the difficulties which have been encountered in connection with the spreading of animal hides and with their bulging in front of a pair of transport rollers. Even wet hides of substantial thickness, the direct feeding of which to a pair of transport rollers has always caused considerable difficulties, may now without any auxiliary means be safely spread by an apparatus according to the invention and simultaneously fed into the spacing between the transport rollers. Thus, the demands on the operating personnel have been considerably reduced which in turn leads to a saving of time previously necessary for feeding the sheet material. In addition the apparatus according to the invention provides protection against injuries because the guide member 3 makes it unnecessary for the operating personnel to bring their hands into the space between the rollers. The clean and safe guiding of the sheet material has the further advantage that a more precise handling is assured which results in an improved quality of the sheet material handled by an apparatus according to the invention.

It should be emphasized that the above-outlined advantages apply equally to sheet material other than leather. The invention may be employed advantageously in all instances where the guiding of sheetlike flexible material to a pair of transport rollers creates a danger that the sheet material would tend to bulge and wrinkle in the spacing between the transport rollers.

What I claim is:

1. An apparatus for feeding hides to a knife for producing so-called bridging leather, comprising an upper transport roller and a lower transport roller arranged alongside each other with a spacing between the rollers to provide a feed gap, the rotation of said rollers defining a transport direction for said hides, a feed-in table arranged upstream of said feed gap relative to said transport direction, said feed-in table having an edge facing the feed gap and a horizontal top surface located above a horizontal plane through said feed gap, hide guide means positioned between said edge and said feed gap, said hide guide means including a guide surface which has a curved bridging section at its upper end providing a smooth passage between said top surface of the feed-in table and said guide surface proper as well as a lower tip reaching into said feed gap substantially to a line just ahead of the narrowest width of the feed gap whereby a funnel shaped inlet is formed so that the leading edge of a hide is guided directly into the feed gap.

2. The apparatus according to claim 1, wherein said guide surface proper has a concave curvature which faces said upper transport roller and wherein said curved bridging section has a convex shape also facing said upper transport roller and forming said smooth passage.

3. The apparatus according to claim 1, wherein said upper transport roller has a predetermined radius, and wherein said guide surface proper has a curvature having a radius larger than said predetermined radius of the upper transport roller.

4. The apparatus according to claim 1, wherein said guide surface proper and the briding section comprise a surface finish such that the coefficient of friction between the hide guide means and the sheet material is several times smaller than the respective friction coefficient between the upper transport roller and the sheet material.

5. The apparatus according to claim 1, further comprising means for rigidly attaching said guide means to the edge of said feed-in table.

6. The apparatus according to claim 1, further comprising means for yieldingly attaching said guide means to the edge of said feed-in table, and for locating the guide means so that said curved bridging section provides said smooth passage at all times.

7. The apparatus according to claim 1, in which said guide means comprises a plurality of guide surface elements, each element including said curved bridging section, and means for yieldingly supporting said guide surface elements between said table edge and said upper transport roller to form a row of guide surface elements.

8. The apparatus to claim 1, further comprising adjusting means operatively connected between the feed-in table and the guide means for adjusting the spacing between the guide surface of the guide means and the upper transport roller.

9. An apparatus for feeding hides to a knife for producing so called split leather, comprising an upper transport roller and a lower transport roller each roller having a longitudinal axis, said rollers being arranged alongside each other with a spacing between the rollers to provide a feed gap, the rotation of said rollers defining a transport direction for said hides, a feed-in table arranged upstream of said feed gap relative to said transport direction, said feed-in table having a horizontal top surface extending below said feed gap and substantially at a right angle relative to a plane extending through said longitudinal axes of both rollers, said feed-in table having a table edge facing said lower transport roller, hide guide means positioned upstream of said feed gap and above said table edge, said hide guide means including a guide surface which has a convex curved portion upstream of a concave curved portion, said portions facing said horizontal table surface and lower transport roller, said hide guide means further including a tip downstream of said concave portion, said tip reaching into said feed gap substantially to a line just ahead of the narrowest width of the feed gap, whereby the leading edge of a hide is guided directly into the feed gap.

10. The apparatus according to claim 9, wherein said table edge has a curvature substantially conforming to the circumference of said lower transport roller.

UNITED STATES PATENT OFFICE
CERTIFICATE OF CORRECTION

Patent No. 3,620,528           Dated November 16, 1971

Inventor(s) Rudolf Skocir

It is certified that error appears in the above-identified patent and that said Letters Patent are hereby corrected as shown below:

Column 6, line 2, "bridging" should read -- split --.

Signed and sealed this 29th day of August 1972.

(SEAL)
Attest:

EDWARD M. FLETCHER, JR.        ROBERT GOTTSCHALK
Attesting Officer                Commissioner of Patents